United States Patent [19]
Tripp et al.

[11] Patent Number: 5,639,493
[45] Date of Patent: Jun. 17, 1997

[54] METHOD FOR PREPARING NON-ALCOHOLIC MALT BEVERAGES

[75] Inventors: Matthew L. Tripp, Nashotah; Sydney Rader, Fredonia, both of Wis.; David S. Ryder, Libertyville, Ill.

[73] Assignee: Miller Brewing Company, Milwaukee, Wis.

[21] Appl. No.: 477,046

[22] Filed: Jun. 7, 1995

Related U.S. Application Data

[62] Division of Ser. No. 29,740, Mar. 11, 1993, Pat. No. 5,439,699.

[51] Int. Cl.$^6$ .................. A23L 2/38; A23L 2/60; C12C 11/11; C12C 12/04
[52] U.S. Cl. ............... 426/12; 426/330.4; 426/490; 426/592
[58] Field of Search .................. 426/14, 329, 493, 426/592, 12, 330.4, 490

[56] References Cited

U.S. PATENT DOCUMENTS

| | | | |
|---|---|---|---|
| 3,615,024 | 10/1971 | Michaels | 210/490 |
| 3,798,331 | 3/1974 | Bavisotto | 426/16 |
| 4,089,778 | 5/1978 | Gauger | 210/23 F |
| 4,440,795 | 4/1984 | Goldstein et al. | 426/592 |
| 4,532,140 | 7/1985 | Bonnome | 426/13 |
| 4,581,236 | 4/1986 | Bandel et al. | 426/14 |
| 4,612,196 | 9/1986 | Goldstein et al. | 426/14 |
| 4,617,127 | 10/1986 | Light | 210/651 |
| 4,664,918 | 5/1987 | Tilgner et al. | 426/14 |
| 4,666,718 | 5/1987 | Lowery et al. | 426/13 |
| 4,717,482 | 1/1988 | Light | 210/651 |
| 4,746,518 | 5/1988 | Schur | 426/15 |
| 4,767,640 | 8/1988 | Goldstein et al. | 426/600 |
| 4,778,688 | 10/1988 | Matson | 426/425 |
| 4,792,402 | 12/1988 | Fricker | 210/651 |
| 4,806,366 | 2/1989 | Dick et al. | 426/15 |
| 4,816,407 | 3/1989 | Matson | 435/287 |
| 4,888,189 | 12/1989 | Gnekow | 426/231 |
| 4,933,198 | 6/1990 | Lee et al. | 426/319 |
| 4,943,436 | 7/1990 | Ogden | 426/16 |
| 4,963,381 | 10/1990 | Girard et al. | 426/490 |
| 4,970,082 | 11/1990 | Huige et al. | 426/16 |
| 4,975,297 | 12/1990 | Gresch | 426/495 |
| 4,990,350 | 2/1991 | Rohmann | 426/330.4 |
| 4,999,209 | 3/1991 | Gnekow | 426/592 |
| 5,075,123 | 12/1991 | Schwinghammer | 426/493 |
| 5,294,450 | 3/1994 | Word et al. | 426/11 |
| 5,439,699 | 8/1995 | Tripp et al. | 426/592 |

FOREIGN PATENT DOCUMENTS

| | | |
|---|---|---|
| 1517900 | 1/1965 | Germany. |
| 1045191 | 10/1966 | United Kingdom. |
| 1177126 | 1/1970 | United Kingdom. |

OTHER PUBLICATIONS

Papazian, C., The New Complete Joy of Home Brewing, Avon Books, New York, 1991, pp. 92, 252, 253, 372 and 373.

Dialog Abstract (File 79: Foods Ad libra), North American New Product Report, Sep. 1992, pp. 5 and 7.

*Primary Examiner*—Esther Kepplinger
*Assistant Examiner*—Curtis E. Sherrer
*Attorney, Agent, or Firm*—Quarles & Brady

[57] ABSTRACT

A method is disclosed of preparing a colorless, clear beer by a method including ultrafiltration and the addition of dextrins, bittering agents and a foam enhancer. Methods of preparing improved nonalcoholic malt beverages and making natural beer foaming components also are disclosed.

5 Claims, 1 Drawing Sheet

METHOD FOR PREPARING NON-ALCOHOLIC MALT BEVERAGES

This is a division of application Ser. No. 08/029,740 filed Mar. 11, 1993, now U.S. Pat. No. 5,439,699.

FIELD OF THE INVENTION

The present invention generally relates to brewing. More particularly, it relates to a novel colorless, clear beer and methods of preparing it.

BACKGROUND OF THE INVENTION

Conventional beers are usually straw-colored or darker colored liquids. Although colorless, clear, products have been made in the past by the brewing industry, those products were not beers and they were used as a base for flavored products.

The Goldstein et al. U.S. Pat. No. 4,440,795 discloses a process for the production of a stable, malt beverage which comprises subjecting a beer to reverse osmosis using a membrane having a molecular weight cutoff (MWCO) of about 200 to obtain a permeate, which consists of water, alcohol, and organics having a molecular weight of less than about 200. The permeate obtained does not possess an acceptable beer flavor but it is useful as a base to which citrus flavoring can be added to obtain a flavored malt beverage.

A second Goldstein et al. U.S. Pat. No. 4,612,196 discloses a method of preparing a straw-colored beer of low alcoholic content using a reverse osmosis membrane wherein a retentate is used having a molecular weight cutoff (MWCO) of less than about 100 for organics. However, the product, the retentate portion, obtained is not a colorless, clear beer.

The recent introduction and consumer acceptance of colorless, clear, cola drinks suggests that there could be a consumer demand for a colorless, clear beverage having an acceptable beer flavor and other desirable beer characteristics.

SUMMARY OF THE PRESENT INVENTION

It is an object of the present invention to disclose a novel, colorless, clear beer having an acceptable beer flavor and other desirable beer characteristics.

It is a further object to disclose a method of making such a clear, colorless beer.

It is still further an object to disclose a novel natural brewing product that can be used to enhance the foam characteristics of the clear beer and other malt beverages.

Still further, it is an object to disclose a method of preparing a superior tasting nonalcoholic malt beverage from a by-product of the method of making the clear beer.

It also is an object to disclose an efficient brewing method which produces both a colorless, clear beer and a nonalcoholic beer.

It is still further an object to disclose a method of improving the body and dryness of a colorless clear beer and a nonalcoholic malt beverage.

The novel beer of the present invention is a colorless or water-white, clear beer having a color (ASBC standard method) (SRM) reading of about 0.1 to about 0.3 SRM. Isohumulones, which are bittering components of hops and can cause light-struck off-flavor are removed from the starting beer as part of the process and replaced with light stable extract (tetrahydroisohumulones or THISO) post ultra-filtration, prior to packaging.

The method of the present invention for preparing a colorless, clear beer basically comprises: subjecting a feed beer containing about 3 to about 7% alcohol, about 20 to about 50 bitter units (BU) and a color reading of about 4° to about 6° SRM to ultrafiltration using a membrane with a nominal 300 molecular weight cutoff (MWCO) range and a pressure of about 30 psi. to about 190 psi. to obtain a permeate containing about the same level of alcohol as the starting beer, and having less than 2 BU (or less than 1 ppm) of isohumulones and a color reading of less than 0.2° SRM; adding to the permeate, if necessary, an effective amount of a hop bittering agent to obtain the desired bitter flavor in the clear beer; increasing the content of high and intermediate dextrins in the permeate to add body, sweetness, dryness and balance; and, adding an effective amount of a natural beer foaming component to the permeate to produce a colorless, clear beer.

In the preferred method of the present invention, the ultrafiltration membrane is a membrane having the same properties as the Osmonics MX07 300 UF polyamide/polysulfone composite membrane and the amount of high dextrins (typically found in a 10 DE syrup) and intermediate dextrins (typically found in a 26 DE syrup) is increased to about 0.5% to about 3% by weight of the final beer.

The present invention also discloses a method of making a straw-colored, nonalcoholic malt beverage from the retentate resulting from the ultrafiltration step used to prepare the clear beer. The preparation of the nonalcoholic malt beverage comprises isolating the retentate and diafiltering (dilution followed by ultrafiltration) it with an aqueous diluent until an alcohol content of 2% (w/w) is reached. The retentate is then diluted four times with diluent to about 0.4% alcohol (w/w); increasing the diluted retentate's content of intermediate dextrins to about 1 to about 5% by weight to add body and sweetness; and, then diluting the alcohol content, if needed, to about 0.5% v/v or 0.4% w/w.

The preferred method of the present invention for preparing the clear beer can also be used to very efficiently prepare both the clear beer and a straw-colored, nonalcoholic malt beverage from a single conventionally brewed feed beer.

The method of the present invention for preparing a natural beer foaming component for malt beverages comprises treating a conventionally brewed beer with about 0.25 to about 1.0% activated carbon by weight, permitting the activated carbon to contact the beer for at least 2 minutes at a temperature of about −1° to about 30° C. and then removing the carbon by filtration to obtain a filtrate which is a natural beer foaming component. Any one of the several types of filters common to brewing or a laboratory may be used including a Millipore filter, a Schenk leaf filter using perlite as body feed, a Schenk plate and frame filter using nitrocellulose, polypropylene, or cellulose sheet filter media.

The method of the present invention for increasing the body and dryness of a nonalcoholic beer comprises adding to nonalcoholic beer about 1 to about 5% of intermediate dextrins found in a typical 26 DE syrup. The preferred intermediate dextrins are products similar to Staley 200 or 225 which is available from the E. F. Staley Co. of Decatur, Ill.

Figure 1:
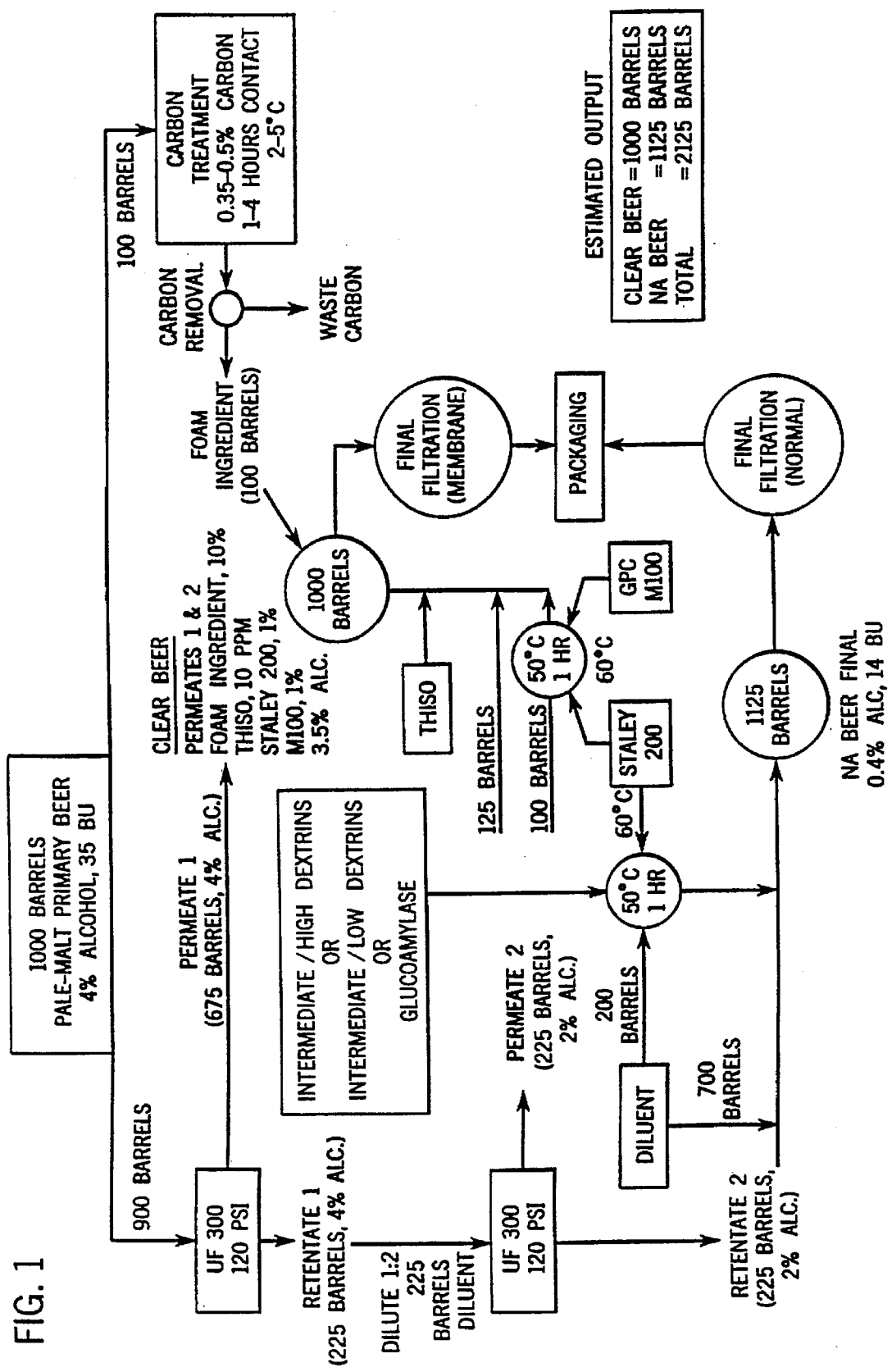
FIG. 1 depicts a flow chart of the present invention using as a basis 1000 barrels of feed beer.

It will be apparent to those skilled in the art from the description which follows that the stated objects and other advantages can be achieved by practice of the present invention.

DESCRIPTION OF THE PREFERRED EMBODIMENT

Referring to FIG. 1, in the preferred method of the present invention both a clear beer and a nonalcoholic malt beverage (NA) are co-produced. By using the preferred method, for example, 1000 barrels of a feed beer (4% alcohol) can be converted into 2125 barrels of final product (1000 barrels of the clear beer and 1125 barrels of nonalcoholic beer).

For purposes of illustration, the preferred method is described starting with 1000 barrels feed beer (4% alcohol, 35 BU). 100 barrels of the feed beer are carbon treated and filtered to remove the carbon and obtain a filtrate for use as a natural beer foaming component. The remaining 900 barrels of the feed beer are concentrated 4 fold via ultrafiltration with the preferred membrane to obtain 675 barrels of a 1st permeate (4% alcohol) for preparing the colorless, water-white, clear beer and 225 barrels of a retentate (4% alcohol). In other words, the beer components retained by the ultrafiltration membrane have a 4 fold greater concentration in the retentate than they do in the feed beer by virtue of the respective volumes of feed beer to retentate (900 barrels:225 barrels or 4:1). The retentate is diluted to two times with diluent water, and the 450 barrels of diluted retentate is subjected to ultrafiltration using the same type of membrane. The 225 barrels of the 2nd permeate (2% alcohol) are used as described herein to make the clear beer and the 225 barrels of the retentate (2% alcohol) is used for preparing the NA beer.

To formulate the colorless, water-white, clear beer the following are blended:

675 barrels of permeate 1 (4% alcohol)
225 barrels of permeate 2 (2% alcohol)
100 barrels of the carbon treated feed beer (4% alcohol)
1% final concentration of intermediate dextrin (Staley 200)
1% final concentration of high dextrin (GPC M100)
10 ppm final concentration of the light stable hop extract, tetrahydroisohumulone (THISO)

One product obtained is 1000 barrels of a colorless, water-white, clear beer (3.5 w/w alcohol, 10 BU). To formulate the nonalcoholic (NA) malt beverage the following are blended:

225 barrels retentate (2% alcohol, 40 BU)
900 barrels diluent water
4% intermediate dextrin (Staley 200)

The second product obtained is 1125 barrels of a nonalcoholic (NA) beer (0.4% w/w alcohol; 14 BU).

The grand total of the colorless, water-white, clear beer and the nonalcoholic (NA) beer is 2125 barrels.

The feed beer may be a commercial beer or a specially brewed pale beer. Several different commercial beers have been used as the starting material. For example, a 80–100% pale malt beer having a color of about 4° to about 5° SRM may be used. However, a 100% pale malt beer having a color of about 4° to about 5° or less than 5° SRM is preferred.

The properties of the ultrafiltration membrane to be used in the process of the present invention are important. The membrane must permit ethanol to pass therethrough. If the membrane pore size is too large (e.g., MWCO 500), the permeate, which is used to make the clear beer will be too colored and not acceptable. Also, if the membrane is too tight, the permeation rate will be intolerably slow and important flavor components in the feed beer will be retained, resulting in an unpleasant, unbalanced, and unacceptable permeate. The permeation rate is a function of the characteristics of the starting beer and filter membrane. A membrane with a nominal 300 molecular weight cut-off range and with the same properties as the OSMONICS MX07 UF300 polyamide/polysulfone composite membrane is preferred.

It also has been found that the flavor of the permeate and the colorless, clear beer and the retentate and the resulting nonalcoholic malt beverage are influenced by the flavor of the feed beer. The greater the flavor of the feed beer, the more flavorful the permeate and retentate. For example, permeates made from highly hopped feed beers (e.g., 35 BU Cascade hops) have proportionately more hop flavor. Similarly, permeates with greater malt flavor are obtained when 100% malt was used in place of an adjunct such as syrups. The preferred feed beers are 100% pale malt brews which give water-white permeates. It is apparent that important beer flavor molecules permeate the membrane, and their concentration can be increased, decreased, and changed by changing the brewing ingredients and levels of ingredients and regime.

An excellent, natural beer foam for the colorless, water-white, clear beer can be made using natural beer foaming components made by a variety of processes, including cold contact of water with ground malt followed by carbon treatment to reduce color (5% use level), carbon treatment of the preferred ultrafiltration retentate (4% use level), carbon treatment of Brewer's yeast extract (2–10% use level), or carbon treatment of the feed beer (6–12% use level).

The natural beer foaming components made by the cold contact with malt process, while imparting excellent foam to the beer, requires special equipment and may impart a biscuit off-flavor to the final product, therefore it is less preferred. The natural beer foaming components made by carbon treating the retentate also produces excellent foam and adds desirable malty flavor, however the removal of carbon from the viscous retentate can be difficult and requires special equipment. The preparation of the Brewer's yeast extract requires special equipment. Therefore they are less preferred.

The preferred natural beer foaming components are made by the carbon treating of a portion of the feed beer and removing the carbon with filtration to obtain a product which when added to the permeate at 6–12% w/w imparts excellent foam and a malty flavor. Furthermore, removal of the carbon from the feed beer can be accomplished using filtration employed in normal brewery operations or any one of a variety of filtration devices and is a relatively easy task.

The carbon for use in the method of making the natural beer foaming components of the present invention is preferably a food grade activated carbon. An acceptable carbon is DARCO KBB made by American Norit Company, Inc., 1050 Crown Pointe Parkway, Suite 1500, Atlanta, Ga. 30338. The quantity to be used is preferably about 0.25 to about 1.0% by weight or about 0.67 lbs. to about 2.68 lbs. per barrel of feed beer which is calculated as follows: 0.25% is 2.5 g/L×3.78 L/gallon×31.5 gallons/barrel×0.0022 lb/g= 0.672 lbs/barrel. The carbon is kept in the feed beer for a period long enough to absorb color bodies and to reduce the color to the desired level (e.g. at least about 2 minutes). The carbon is then removed using any one of a variety of filtration devices, such as a Millipore membrane filter (38 L scale), which is available from the Millipore Filter Corporation of Bedford, Mass.

The use of diatomatous earth (DE) as a filter aid is to be avoided because it tends to remove proteins beneficial to foam formation. Similar foam losses resulted when cellulosic pads containing DE were used. It also has been found in making the clear beer, that the use of diatomatous earth (DE) as a filter aid in the removal of carbon or as a final polishing filter prior to packaging results in a dramatic reduction in foam, presumably due to protein removal. Therefore, it is not recommended. Although a cellulose filter aid is preferred at plant scale to remove carbon, the Millipore type membrane filters (38 L scale) are preferred at lab scale because they can be used both to remove the carbon from the foaming component and as a final filter for the beer without having any effect on foam amount and quality.

We also have discovered that a more desirable beer-like body and dryness can be produced in either the clear beer or a nonalcoholic malt beverage by increasing the concentration of dextrins. A combination of intermediate dextrins (e.g. Staley 200 or 225) to provide body and high molecular weight dextrins (e.g. GPC's M100 Maltrin) to provide body and dryness are used to make the preferred colorless, clear beer at levels of about 1% by weight each. The preferred dextrins content for the nonalcoholic malt beverage is obtained by adding about 1-5% by weight of the intermediate dextrins (Staley 200 or 225).

The bitterness of the colorless, water-white, clear beer and the nonalcoholic beer can be important. During the ultrafiltration step of the preferred method of the present invention using highly hopped feed beers (20-45 BU), a 30-50% loss of bittering units (BUs) occurs, resulting in a less bitter retentate than expected. Levels of BUs in the permeate are typically below the level of meaningful detection (<2 BU). Carbon treatment of the feed beer also removes BUs to a point below detection resulting in a light stable fraction.

In making the clear beer a hopping material is added to obtain the desired BU level prior to the final filtration. The preferred hopping material is tetrahydroisohumulone (THISO) disclosed in U.S. Pat. No. 4,644,084. When it is used as the source of bittering, the light stability of the colorless, clear beer is not an issue.

A variety of nonalcoholic (NA) beers can be made using the retentate from the ultrafiltration of the preferred method. The retentate which would normally be a waste stream produces nonalcoholic malt beverage which are beer-like with little or no wortiness.

In the preferred method of improving the body and dryness of a nonalcoholic malt beverage the dextrose and intermediate dextrin contents are increased. The result is an beer which has the desired alcohol sweetness, body and dryness and which is balanced without any excess bitterness. One method of accomplishing this is to use glucoamylase (GA) at about the same level (e.g. 882 units GA/liter; 1 unit is 1 micromole of dextrose liberated per minute at pH 4.3 using a 10 DE starch) that the GA is used in making a light beer, followed by a residence time of about 4-8 days depending on the degree of attenuation desired (4 days, 0.5% dextrose; 8 days, 1% dextrose), and followed by flash pasteurization. The resulting nonalcoholic malt beverage has a rich, creamy, well balanced character. Most preferably, glucoamylase is added directly to the diluted retentate.

A second method of improving the body and dryness of a nonalcoholic beer is to increase the dextrose and intermediate dextrin content of the nonalcoholic malt beverage by simply adding low and intermediate sized dextrins to add body, sweetness, and balance. It has been found that the addition of 1-5% intermediate dextrins (Staley 200 or 225) results in a full bodied, nicely balanced nonalcoholic malt beverage. The increase in dextrose and intermediate dextrin content by either the use of GA or the addition of intermediate dextrins provides a method for making a wide range of nonalcoholic malt beverages of improved properties.

The practice of the invention is further illustrated by the examples.

EXAMPLE 1

Preparation of Feed Beer

A wort (12.5° Plato) was prepared from the following ingredients:

| | |
|---|---|
| Pale Malt, lbs. | 21,100 |
| Foundation Water, bbl. | 180 |
| Sponge Water, bbl | 94 |
| Chase Water, bbl | 2 |
| CaSO$_4$ lbs. | 30 |
| CaCl$_2$, lbs. | 26 |

The ingredients were mashed at 115° F. red method. The retentate which would normally be a waste stream produces nonalcoholic malt beverage which are beer-like with little or no wortiness.

In the preferred method of improving tlauter tun and boiled for 60 minutes. It was kettle hopped with 100% Cascade hops (125 lbs.) to 33.5 BU. It was aerated and pitched at about 10 million cells/cc, of *Saccharomyces uvarum* and fermented at a constant 60° F. (15.5° C.). The yeast concentration reached a maximum of 7.35 grams/liter (dry weight basis). About 190 hours were required to complete the fermentation. The feed beer obtained had a conventional lager beer taste with the exception that it had more hop flavor and aroma and bitterness than many typical lager beers. The finished feed beer contained about 3.65% w/w alcohol (4.67% by volume); had a BU level of 33.5, was pale straw-colored (4.5° SRM) and had a specific gravity of 1.0102.

EXAMPLE 2

Ultrafiltration of Feed Beer

The feed beer of Example 1 is concentrated by ultrafiltration using an OSMONICS MX07 UF300 membrane at 120 psi. When only a colorless, water-white, clear beer is desired, the beer can be concentrated up to 10 fold with the resulting permeate being the base. When an NA malt beverage is being co-produced, only a 4 fold concentration is perferred so as not to deplete the retentate of important beer flavor compounds. In other words, the beer components retained by the ultrafiltration membrane have a 10 fold or a 4 fold greater concentration in the retentate than they do in the feed beer by virtue of the respective volumes of feed beer to retentate (10:1 or 4:1, respectively). The retentate can be diluted with diluent water in equal parts to the retentate (1:1), subjected to a second ultrafiltration and the second permeate added back to the clear beer. As a result no alcohol is lost to waste.

EXAMPLE 3

Preparation of Colorless, Clear Beer

To a permeate obtained by the ultrafiltration process of Example 2 there is added 1% by weight of intermediate dextrins and 1% by weight of high dextrins. At plant scale, the syrups can be mixed by adding them slowly to the front end of a circulation pump in a typical circulation loop. At laboratory or pilot scale to facilitate the mixing of the intermediate and high dextrins (Staley 200 and M100 Maltrin) with the permeate, a mixture is prepared (10% Staley 200 and 10% GPC's M100) in a portion of the permeate, and dissolved by heating to 120° F. for 30–60 minutes to form a concentrate. This concentrate is then added to the permeate to a final formulation concentration of 1% Staley 200 and 1% GPC M100. The natural beer foaming component prepared by carbon treatment of the feed beer (as described in Example 5) is added at 10% to impart foam. The formulation is completed by adding the hopping material tetrahydroisohumulone (THISO) to a final concentration of 10 ppm. The colorless, water-white, clear beer is then final filtered prior to packaging using a 0.45 micrometer membrane filter.

A typical clear beer obtained by the preferred method of the invention has the following composition:

| | |
|---|---|
| Alcohol, % w/w | 3.65 |
| Alcohol, % v/v | 4.56 |
| Real Extract, % w/w | 2.25 |
| Extract/Alcohol | 0.63 |
| Orig Gravity, Calc. | 9.26 |
| App Extract, % w/w | 0.61 |
| Specific Gravity | 1.00236 |
| Calories/12 oz | 120 |
| pH | 4.7 |
| Color, SRM | 0.2 |
| BU | 8.2 |
| Initial Clarity | 40 |

EXAMPLE 4

Nonalcoholic Malt Beverage Retentate

A 20–40% solution of intermediate dextrins (Staley 200) is made up in diluent water and dissolved by heating at 120° C. for 30–60 minutes, and then added to the diafiltered retentate (2% alcohol) from Example 2 to a final product concentration of 4%. The retentate is further diluted to 0.4% w/w alcohol, and the product is final filtered and packaged as for a regular nonalcoholic malt beverage.

EXAMPLE 5

Preparation of Natural Beer Foaming Component

A portion of the feed beer of Example 1 is treated with 0.25–1.0% Darco KB-B carbon (pre-slurried with 60° C. water) at −1–5° C. for a minimum contact time of 2 minutes (up to a 12 hour contact time has been found to be acceptable). The carbon is then removed by filtration for example using a 0.45 micrometer (0.8 um, carbon fines bleed through) membrane filter (Millipore type HA nitrocellulose). (With this filter, 100 barrels of 0.35%–0.5% carbon treated primary beer can be filtered in 8 hours using 375 square feet of membrane.) The decolorized natural beer foaming component (color less than 1.0° SRM) is held until required.

EXAMPLE 6

Preparation of Natural Beer Foaming Component From Malt

Conventional brewer's malt is ground and mixed with 1 to 5 parts water to 1 part malt at 1° to 15° C. The resulting mash is strained and centrifuged with the sediment being discarded. A clear supernatant is diafiltered four times using an OSMONICS UF 3000 membrane to remove unwanted color and flavor. The permeates are discarded. The retentate is concentrated, pasteurized for 15 minutes at 65° C. and centrifuged to obtain a clear supernatant fluid which can be used as a natural beer foaming component. The supernatant fluid can be further treated with carbon to improve its foaming properties.

EXAMPLE 7

Preparation of Natural Beer Foaming Component From Retentate

To a retentate obtained from the ultrafiltration process of Example 2 there is added 0.5 to 2% Darco KB-B carbon (pre-slurred with 60° C. water) at −1° to 85° C. for a minimum contact time of 2 minutes up to 1 hour. The carbon is removed in the same manner as set forth in Example 5 to result in a similar decolorized natural beer foaming component which is held until required.

EXAMPLE 8

Preparation of Natural Beer Foaming Component From Brewer's Yeast

To a permeate obtained from the ultrafiltration process of Example 2 there is added a carbon treated Brewer's yeast estract. The Brewer's yeast is disrupted by any one of a variety of methods, for example, shaking with glass beads or disruption using a Gallun homogenizer. The extract is clarified by centrifugation and the supernatant is treated with Darco KB-B carbon in the same amount and manner as set forth in Example 7 and the carbon removed from the Brewer's yeast extract in the manner set forth in Example 5 to result in the natural beer foaming component.

It will be readily apparent to those skilled in the art that a number of modifications and changes may be made without departing from the spirit and scope of the present invention. Therefore, it is intended that the invention only be limited by the claims.

We claim:

1. A method of making a nonalcoholic malt beverage which comprises:
   (a) subjecting a feed beer having about 3% to about 7% alcohol and a color of about 4° to about 5° SRM to ultrafiltration using a membrane having a MWCO of about 300 to obtain a first retentate containing about 3% to 7% alcohol;
   (b) diluting the first retentate with a diluent comprising water;
   (c) subjecting the diluted first retentate to ultrafiltration using a membrane having a MWCO of about 300 to obtain a second retentate; and
   (d) adjusting the alcohol content of the second retentate, if needed, to less than 0.5% v/v to obtain a nonalcoholic malt beverage.

2. The method of claim 1, further comprising the step of increasing the concentration of dextrins in the nonalcoholic malt beverage to improve body and dryness.

3. The method of claim 2, wherein the dextrins are increased by adding high and intermediate sized dextrins.

4. The method of claim 2, wherein the dextrins are increased by adding glucoamylase.

5. The method of claim 2, wherein the dextrins are increased by adding low and intermediate sized dextrins.

* * * * *

UNITED STATES PATENT AND TRADEMARK OFFICE
CERTIFICATE OF CORRECTION

PATENT NO. : 5,639,493
DATED : June 17, 1997
INVENTOR(S) : Matthew L. Tripp, et al.

It is certified that error appears in the above-indentified patent and that said Letters Patent is hereby corrected as shown below:

Column 2, Line 22:

"Osmonics" should read --OSMONICS--

Column 4, Line 60:

"3.78" should read --3.785--

UNITED STATES PATENT AND TRADEMARK OFFICE
CERTIFICATE OF CORRECTION

PATENT NO. : 5,639,493
DATED : June 17, 1997
INVENTOR(S) : Matthew L. Tripp, et al.

It is certified that error appears in the above-indentified patent and that said Letters Patent is hereby corrected as shown below:

Column 6, Lines 21-27:

"The ingredients were mashed at 115°F. red method. The retentate which would normally be a waste stream produces nonalcoholic malt beverage which are beer-like with little or no wortiness.

In the preferred method of improving tlauter tun and boiled for 60 minutes."

should read

--The ingredients were mashed at 115°F for 20 minutes, the temperature raised to 156°F and held for 30 minutes and raised to 170°F and held for 5 minutes. The mixture was transferred to a lauter tun and boiled for 60 minutes.--

Signed and Sealed this

Twenty-third Day of December, 1997

Attest:

BRUCE LEHMAN

*Attesting Officer*

*Commissioner of Patents and Trademarks*